(12) United States Patent
Winter

(10) Patent No.: US 9,086,019 B2
(45) Date of Patent: Jul. 21, 2015

(54) TURBOMACHINE THERMAL ENERGY EXCHANGE

(75) Inventor: Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 435 days.

(21) Appl. No.: 13/604,052

(22) Filed: Sep. 5, 2012

(65) Prior Publication Data

US 2014/0000278 A1   Jan. 2, 2014

Related U.S. Application Data

(60) Provisional application No. 61/667,120, filed on Jul. 2, 2012.

(51) Int. Cl.
*F02C 3/30*   (2006.01)
*F02C 7/18*   (2006.01)

(52) U.S. Cl.
CPC ... *F02C 3/30* (2013.01); *F02C 7/18* (2013.01); *Y02T 50/675* (2013.01)

(58) Field of Classification Search
CPC .............. F02C 7/18; F02C 6/08; F02C 7/185; F02C 7/1435; F02C 3/305; F02C 3/30; Y02T 50/675; F23L 7/002; F01D 25/12
USPC .......... 60/39.53, 39.55, 39.83, 266, 267, 728, 60/782, 785, 795, 806
See application file for complete search history.

(56) References Cited

U.S. PATENT DOCUMENTS

| | | | |
|---|---|---|---|
| 4,137,705 A | 2/1979 | Andersen et al. | |
| 4,395,874 A | 8/1983 | Striebel et al. | |
| 4,767,259 A * | 8/1988 | Kurosawa et al. | 415/17 |
| 5,160,096 A | 11/1992 | Perkins et al. | |
| 5,161,365 A * | 11/1992 | Wright | 60/780 |
| 5,255,505 A | 10/1993 | Cloyd et al. | |
| 5,317,877 A * | 6/1994 | Stuart | 60/736 |
| 5,564,271 A | 10/1996 | Butler et al. | |
| 5,611,197 A * | 3/1997 | Bunker | 60/806 |
| 5,697,208 A * | 12/1997 | Glezer et al. | 60/785 |
| 5,722,241 A * | 3/1998 | Huber | 60/728 |
| 6,295,803 B1 | 10/2001 | Bancalari | |
| 6,298,656 B1 * | 10/2001 | Donovan et al. | 60/39.182 |
| 6,427,447 B1 | 8/2002 | Sowa | |
| 6,536,026 B2 | 3/2003 | Gullapalli | |
| 6,920,760 B2 | 7/2005 | Schottler et al. | |

(Continued)

FOREIGN PATENT DOCUMENTS

WO   9703281 A1   1/1997

OTHER PUBLICATIONS

International Search Report and Written Opinion for International Application No. PCT/US2013/046962 completed on Sep. 24, 2013.
International Preliminary Report on Patentability for PCT Application No. PCT/US2013/046962, mailed Jan. 15, 2015.

*Primary Examiner* — Gerald L Sung
*Assistant Examiner* — Scott Walthour
(74) *Attorney, Agent, or Firm* — Carlson, Gaskey & Olds. P.C.

(57) ABSTRACT

An example method of thermal energy exchange within a turbomachine includes heating a liquid using thermal energy from compressed air, injecting the liquid into a first portion of a turbomachine, and using the compressed air to cool a second portion of the turbomachine.

17 Claims, 3 Drawing Sheets

(56) References Cited

U.S. PATENT DOCUMENTS

| | | |
|---|---|---|
| 7,284,377 B2 | 10/2007 | Joshi et al. |
| 7,487,642 B2 | 2/2009 | Joshi et al. |
| 7,647,777 B2 | 1/2010 | Bland |
| 7,874,156 B2 | 1/2011 | Wang et al. |
| 2010/0107592 A1 | 5/2010 | Botero et al. |

* cited by examiner

TURBOMACHINE THERMAL ENERGY EXCHANGE

CROSS-REFERENCE TO RELATED APPLICATIONS

This disclosure claims priority to U.S. Provisional Application No. 61/667,120, which was filed on Jul. 2, 2012, and is incorporated herein by reference.

BACKGROUND

This disclosure relates to exchanging thermal energy and, more particularly, to thermal energy exchange within a turbomachine.

Turbomachines, such as gas turbine engines, typically include at least a compression section, a combustion section, and a turbine section. Turbomachines may employ a geared architecture connecting the portions of the compression section to the turbine section.

During operation, compressed air from the compression section is mixed with fuel and combusted in the combustion section. The products of combustion are expanded to rotatably drive the turbine section. The rotating portions of the turbine section may rotatably power a generator, for example.

In some turbomachines, a fluid, such as water, is injected into the combustion section during operation. The fluid may augment power output and decrease nitrogen oxide emissions.

SUMMARY

A method of thermal energy exchange within a turbomachine according to an exemplary aspect of the present disclosure includes, among other things, heating a liquid using thermal energy from compressed air, injecting the liquid into a first portion of a turbomachine, and using the compressed air to cool a second portion of the turbomachine.

In a further non-limiting embodiment of the foregoing method, the turbomachine may be an industrial turbomachine.

In a further non-limiting embodiment of either of the foregoing methods, the compressed air may be bleed air from a compression section of the turbomachine.

In a further non-limiting embodiment of any of the foregoing methods, the liquid may be water.

In a further non-limiting embodiment of any of the foregoing methods, the method may include communicating the compressed air to a turbine section of the turbomachine after the heating.

In a further non-limiting embodiment of any of the foregoing methods, the first portion of the turbomachine may be a combustion section of the turbomachine.

In a further non-limiting embodiment of any of the foregoing methods, the method may include heating the liquid within a heat exchanger.

A method of thermal energy exchange within a turbomachine according to another exemplary aspect of the present disclosure includes, among other things, heating water using thermal energy from compressed air, communicating the water to a combustion section of a turbomachine after the heating, and communicating the compressed air to a turbine section of the turbomachine after the heating.

In a further non-limiting embodiment of the foregoing method, the turbomachine may be an industrial turbomachine.

In a further non-limiting embodiment of either of the foregoing methods, the method may include receiving the compressed air from a compression section of the turbomachine.

In a further non-limiting embodiment of any of the foregoing methods, the method may include heating the water within a heat exchanger.

In a further non-limiting embodiment of any of the foregoing methods, the heat exchanger may be within a core of the engine.

A thermal energy exchanging arrangement according to another exemplary aspect of the present disclosure includes, among other things, a heat exchanger configured to receive a liquid at a first temperature and to heat the liquid to a second, higher temperature using compressed air from a compression section of a turbomachine, a combustion section of the turbomachine that receives the liquid from the heat exchanger, and a turbine section of the turbomachine that receives the compressed air from the heat exchanger.

In a further non-limiting embodiment of the foregoing thermal energy exchanging arrangement, the liquid may be a water.

In a further non-limiting embodiment of the foregoing thermal energy exchanging arrangement, the combustion section may be within an industrial turbomachine.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
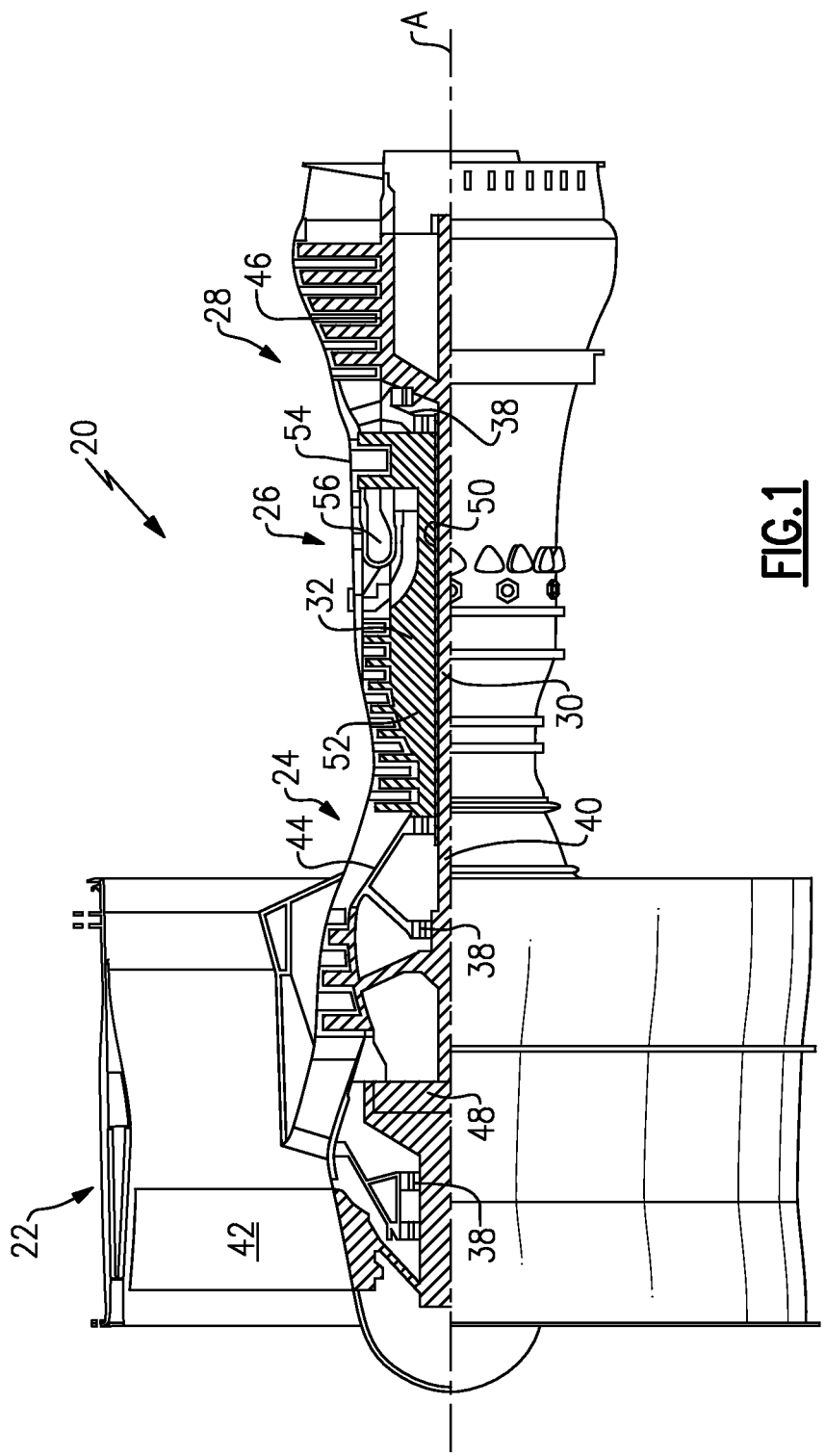
FIG. 1 shows a schematic view of an example turbomachine used for propulsion.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications, such as automotive applications.

In the example engine 20, flow moves from the fan section 22 to a bypass flowpath. Flow from the bypass flowpath generates forward thrust. The compression section 24 drives air along the core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7 ^ 0.5. The Temperature represents the ambient temperature in degrees Rankine. The Low Corrected Fan Tip Speed according to one non-limiting embodiment of the example engine 20 is less than about 1150 fps (351 m/s).

Figure 2:
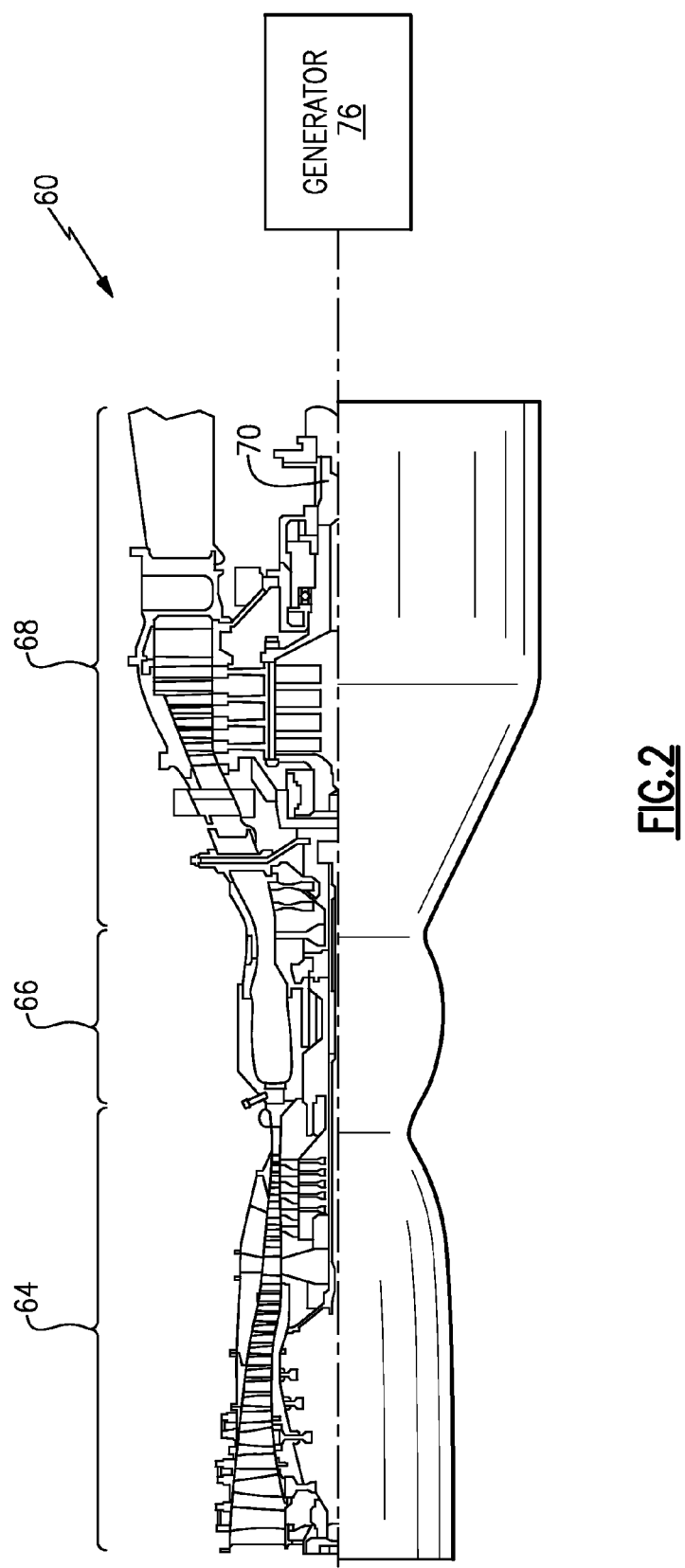
FIG. 2 shows an example industrial turbomachine.
Figures 3, 4:
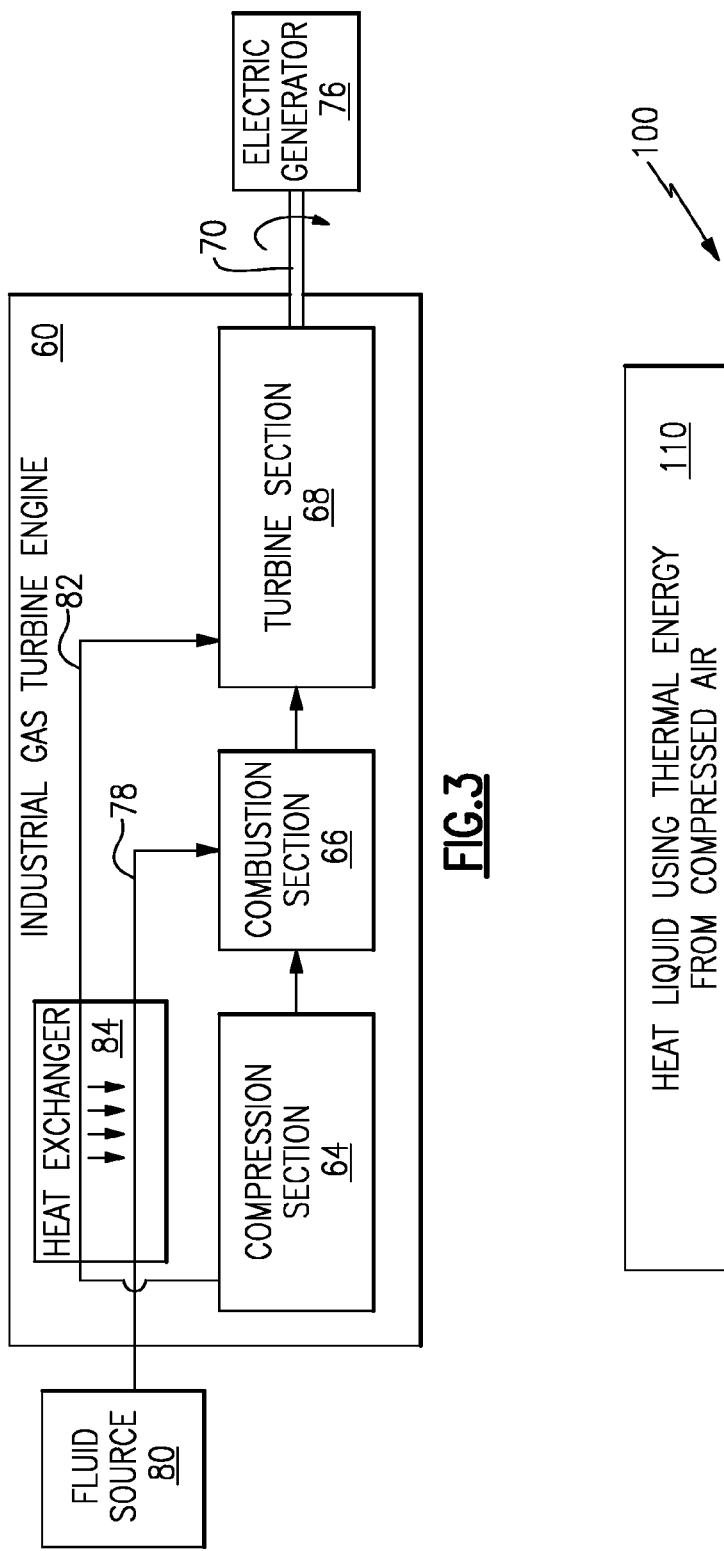
FIG. 3 shows a highly-schematic view of a thermal energy exchange arrangement within the industrial turbomachine of FIG. 2.
FIG. 4 shows the flow of an example method of thermal energy exchange within a turbomachine.

Referring now to FIGS. 2 and 3, another example turbomachine is an industrial gas turbine engine 60. The example industrial engine 60 is a land-based, two-spool turbofan gas turbine engine that generally includes a compression section 64, a combustion section 66, and a turbine section 68.

In the example engine 60, compressed air from the compression section 64 is mixed with fuel and combusted in the combustion section 66. The products of combustion expand through the turbine section 68. Expansion in the turbine section 68 rotates rotors 70 of the engine 60. The rotors 70 rotatably drive an electric generator 76 to produce electrical power in a known manner.

During operation of the engine 60, fluid, such as water, is injected into the combustors within the combustion section 66. The fluid augments power output from the engine 60 and decreases emissions of nitrogen oxides.

The combustion section 66 is a portion of the core engine. Fluid also may be injected into other portions of the core engine.

The engine 60 includes a manifold that directs fluid from a fluid source 80 to the combustion section 66. The manifold is represented by path 78 in this example.

The example engine 60 includes a heat exchanger 84 that adds thermal energy to the fluid before the fluid is injected into the combustion section 66. In this example, cooling air bled from the compression section 64 of the engine 60 is moved through the heat exchanger 84 to add thermal energy to the fluid before the fluid is injected into the combustion section. The example heat exchanger 84 is located axially between a low-speed compressor and a high-speed compressor within the compression section 64.

Compressed air from the compression section 64 moves along path 82 from the compression section 64 to the turbine section 68. The compressed air is used to cool components in the turbine section 68, and specifically the inner surfaces of those components. The compressed air within the path 82 is bled from relatively early stages of the compression section 64, such as from stage 2, 3, or 4. Although eventually used for cooling, the air from the compression section 64 is heated relative to the fluid moving along the path 78.

Within the heat exchanger 84, thermal energy moves from the air within the path 82 to the fluid within the path 78. This exchange of thermal energy raises the temperature of the fluid and lowers the temperature of the cooling air.

Referring to FIG. 4 with continuing reference to FIG. 3, an example method 100 of thermal energy exchange within the turbomachine includes a step 110 of heating a liquid using thermal energy from compressed air. The method 100 also includes a step 120 of injecting the liquid into a portion of a turbomachine.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A method of thermal energy exchange within a turbomachine, comprising:
   heating a liquid using thermal energy from compressed air, the heating occurring within a compression section of the turbomachine;
   injecting the liquid into a first portion of the turbomachine; and
   using the compressed air to cool a second portion of the turbomachine,
   wherein the heating the liquid using thermal enemy from compressed air occurs at a position within the compression section of the turbomachine that is located axially between a low-speed compressor and a high-speed compressor.

2. The method of claim 1, wherein the turbomachine is an industrial turbomachine.

3. The method of claim 1, wherein the compressed air is bleed air from the compression section of the turbomachine.

4. The method of claim 1, wherein the liquid is water.

5. The method of claim 1, further comprising communicating the compressed air to a turbine section of the turbomachine after the heating.

6. The method of claim 1, wherein the first portion of the turbomachine is a combustion section of the turbomachine.

7. The method claim 1, wherein heating the liquid using thermal energy from compressed air further comprises heating the liquid in a heat exchanger located within the compression section using the thermal energy from the compressed air.

8. A method of thermal energy exchange within a turbomachine, comprising:
   heating water using thermal energy from compressed air, the heating occurring within a compression section of the turbomachine;
   communicating the water to a combustion section of the turbomachine after the heating; and
   communicating the compressed air to a turbine section of the turbomachine after the heating,
   wherein the heating of the water using the thermal energy from compressed air occurs at a position within the compression section of the turbomachine that is located axially between a low-speed compressor and a high-speed compressor.

9. The method of claim 8, wherein the turbomachine is an industrial turbomachine.

10. The method of claim 8, wherein the compressed air comprises air from the compression section of the turbomachine.

11. The method of claim 8, wherein heating the water further comprises heating the water within a heat exchanger within the compression section.

12. The method of claim 11, wherein the heat exchanger is within a core of the turbomachine.

13. A thermal energy exchanging arrangement, comprising:
   a heat exchanger configured to receive a liquid at a first temperature and to heat the liquid to a second, higher temperature using compressed air from a compression section of a turbomachine, the heat exchanger located within the compression section of the turbomachine; and
   a combustion section of the turbomachine that receives the liquid from the heat exchanger; and
   a turbine section of the turbomachine that receives the compressed air from the heat exchanger, wherein the heat exchanger is located axially between a low-speed compressor and a high-speed compressor.

14. The thermal energy exchanging arrangement of claim 13, wherein the liquid is water.

15. The thermal energy exchanging arrangement of claim 13, wherein the turbomachine is an industrial turbomachine.

16. The thermal energy exchanging arrangement of claim 13, further comprising a fluid source located upstream from the turbomachine relative to a general direction of flow through the turbomachine, wherein the thermal enemy exchanging arrangement is configured to communicate the liquid along a path from the fluid source to the heat exchanger.

17. The thermal energy exchanging arrangement of claim 13, further comprising an electric generator driven by the turbomachine.

* * * * *